United States Patent [19]

Negard

[11] 4,040,300

[45] Aug. 9, 1977

[54] PNEUMATIC WHEEL BALANCING APPARATUS

[76] Inventor: Donald J. Negard, 129 Cedar Lake Road, North, Minneapolis, Minn. 55405

[21] Appl. No.: 658,389

[22] Filed: Feb. 17, 1976

[51] Int. Cl.² .................. G01M 1/12; G01M 1/20
[52] U.S. Cl. .................................. 73/459; 73/468; 73/484
[58] Field of Search .............. 73/459, 460, 468, 482, 73/483–485

[56] References Cited

U.S. PATENT DOCUMENTS

| | | | |
|---|---|---|---|
| 3,165,932 | 1/1965 | Hemmeter | 73/484 |
| 3,188,869 | 6/1965 | Lash | 73/483 |
| 3,287,979 | 11/1966 | Dohring | 73/483 |
| 3,435,686 | 4/1969 | Waldron | 73/459 |

*Primary Examiner*—James J. Gill
*Attorney, Agent, or Firm*—Stuart R. Peterson

[57] ABSTRACT

An upright post has a rounded bearing member at its upper end provided with a discharge port through which air, supplied at the lower end of the post, exits. A cylindrical bearing body is formed with a vertical bore extending therethrough so as to accommodate therein a longitudinal portion of the upright post, the bore being slightly larger in diameter than the post. The bearing body supports upper and lower balancing mechanisms, each including a plate or platform having four quadrantly located sensing ports. A bearing cap overlying the rounded bearing member is affixed to the platform of the upper balancing mechanism. The platform of the upper balancing mechanism removably rests on the top of the bearing body and has mounted thereon a pair of reversible air motors, each having a shaft and shiftable weight threadedly disposed on the shaft. The platform of the lower balancing mechanism is fixedly attached to the bearing body and carries two adjustable weight means corresponding to the air motors, shafts and weights of the upper balancing mechanism. Pneumatic power amplifiers, which are responsive to differences in pressure, are connected to the upper four sensing ports and additional pneumatic power amplifiers are connected to the lower four ports. Circumscribing the mid-portion of the bearing body is an annular ring for supporting the wheel to be balanced.

12 Claims, 6 Drawing Figures

PNEUMATIC WHEEL BALANCING APPARATUS

BACKGROUND OF THE INVENTION

1. Field of the Invention

This invention relates generally to wheel balancing apparatus, and pertains more specifically to apparatus utilizing an air bearing system.

2. Description of the Prior Art

The art is replete with various types of wheel balancing machines. Some balancing equipment will permit the wheel to be balanced while still on the vehicle. Others require the removal of the wheel from the vehicle, yet rotation thereof when placed on the tester. Rotation of the wheel has been necessary to order to determine the degree of dynamic unbalance that exists. However, weights can only be added after the wheel has stopped and frequently the checks that are made are only approximations. Consequently, repetitive testing is employed in order to achieve a satisfactory degree of both static and dynamic balance. Other testing equipment may not require rotation of the wheel, but such equipment checks only the static unbalance, ignoring the dynamic unbalance that becomes increasingly important at higher speeds when the wheel is remounted on the vehicle.

SUMMARY OF THE INVENTION

Accordingly, an important object of the present invention is to balance vehicle wheels more rapidly and more accurately than heretofore.

Another object of the invention is to achieve both static and dynamic balancing with the same apparatus.

A further object of the invention is to provide balancing apparatus that will be completely automatic, causing weights to be properly positioned without intervention by the attendant or operator. Consequently, the invention has for an aim the employment of relatively unskilled and inexperienced personnel.

Still further, another object is to provide an exceedingly simple machine which performs all of the functions that are required in order to obtain an accurately balanced wheels, both statically and dynamically.

Yet another object of the invention is to provide apparatus of the foregoing character that can be easily calibrated by simply operating the apparatus without placing a wheel thereon and which calibration will remain valid for various size wheels that are to be subsequently balanced.

Another object resides in having a balancing machine in which manufacturing tolerances or clearances are not critical, thereby reducing the cost of the machine and thus contributing it its widespread use.

Still further, an object is to provide balancing apparatus that is compact, lightweight and portable so that it can easily be moved about in a garage, shop or service station.

Still another object of the invention is to provide a pneumatic balancing machine that will require only one source of compressed air, a source usually available in service stations.

Still further, another object is to permit apparatus utilizing my invention to be incorporated permanently into rotative machinery where a balanced condition should be constantly maintained.

Briefly, my invention envisages an upstanding post having a rounded upper bearing member via which air is discharged into the region immediately beneath a similarly configured or domed bearing cap that is attached to the platform of the upper balancing mechanism. Disposed on the platform of the upper balancing mechanism, and quadrantly located with respect to each other, are four sensing ports; four additional sensing ports are located in the platform of the lower balancing mechanism. Hence, when air is supplied under pressure through the discharge port in the bearing member affixed to the upper end of the post, the bearing body, bearing cap and the upper and lower balancing mechanisms are all lifted and function as an air bearing device during the period that air is being supplied.

Any tilting of the bearing body from a true concentric relationship with the post, and any eccentric motion of the bearing body while it is rotating, will close some of the sensing ports to a greater degree than others. The sensing ports are all connected with pneumatic power amplifiers, which are included in the upper and lower balancing mechanisms, that are responsive to small pressure changes existing between diametrically located sensing ports, the amplifiers controlling the flow of air to weight adjusting devices, more specifically to each reversible air motor included in such devices. A threaded shaft is operated by each air motor to shift a weight member, the various weight members, after being properly positioned, denoting a balanced condition of the wheel supported on the bearing body. A weight block diametrically located from each weight adjusting device counterbalances the weight adjusting devices which actually perform the balancing role. By virtue of cooperating indicia of scales associated with each weight member, the operator can quickly determine the amount and location of the weights to be added to the wheel to effect a truly balanced condition thereof.

DESCRIPTION OF THE PREFERRED EMBODIMENT

Figure 1:
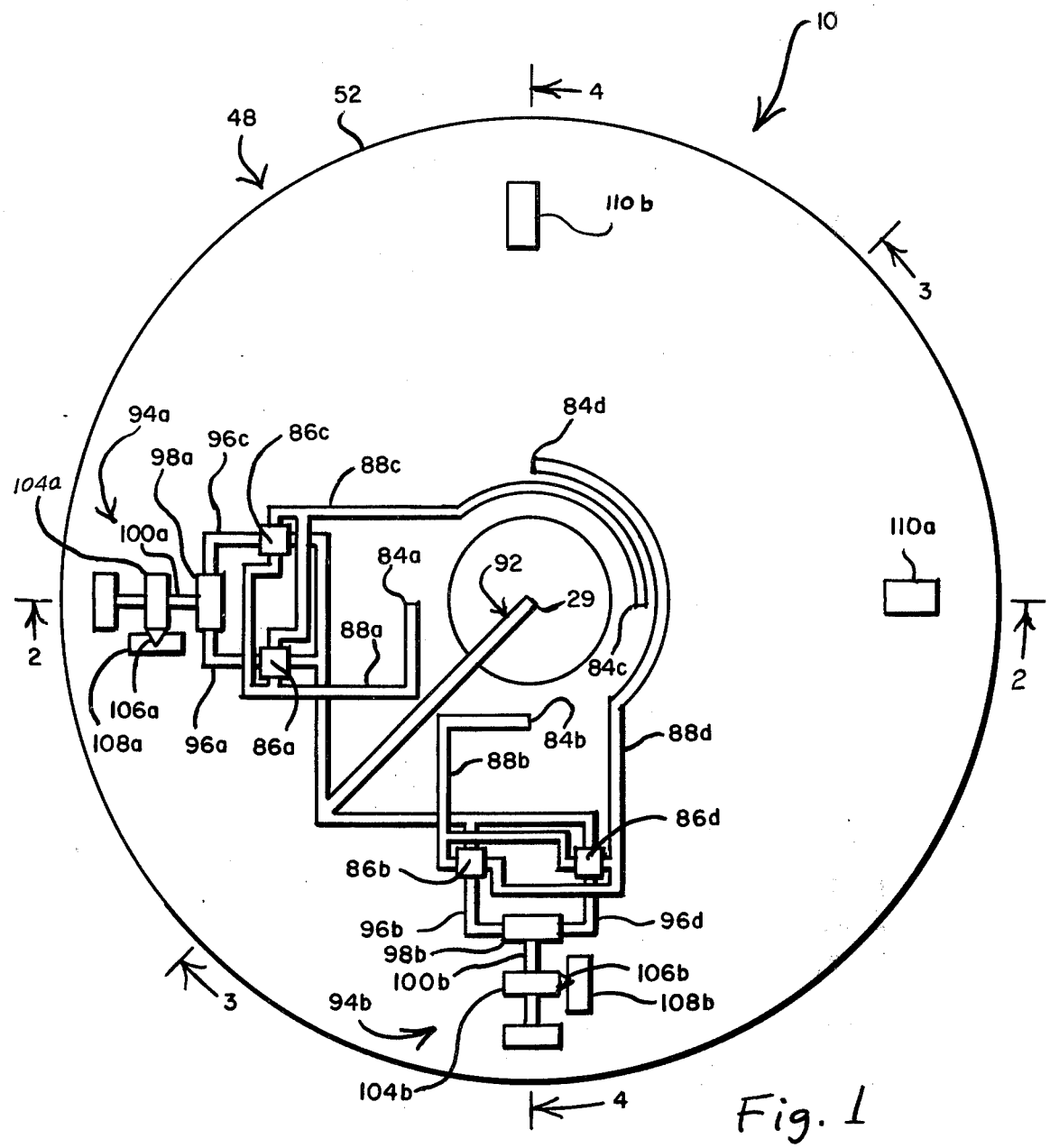
FIG. 1 is a top plan view of apparatus exemplifying my invention.

Apparatus exemplifying my invention has been denoted generally by the reference numeral 10. As best seen from FIG. 2, it includes a base plate 12 having an upwardly directed threaded collar 14 fixedly attached thereto. The threaded collar 14 receives the lower end of a post designated generally by the reference numeral 16. More specifically, the post 16 includes a cylindrical pipe 18 that has its lower end secured to the collar 14, such as by screw threads. At the upper end of the post 16 is a bearing member 20 having a rounded or bullet-shaped upper surface 22, a necked section 24 forming an annular shoulder 26 and a vertical passage 28 forming a discharge port 29 at its upper end.

Figure 2:
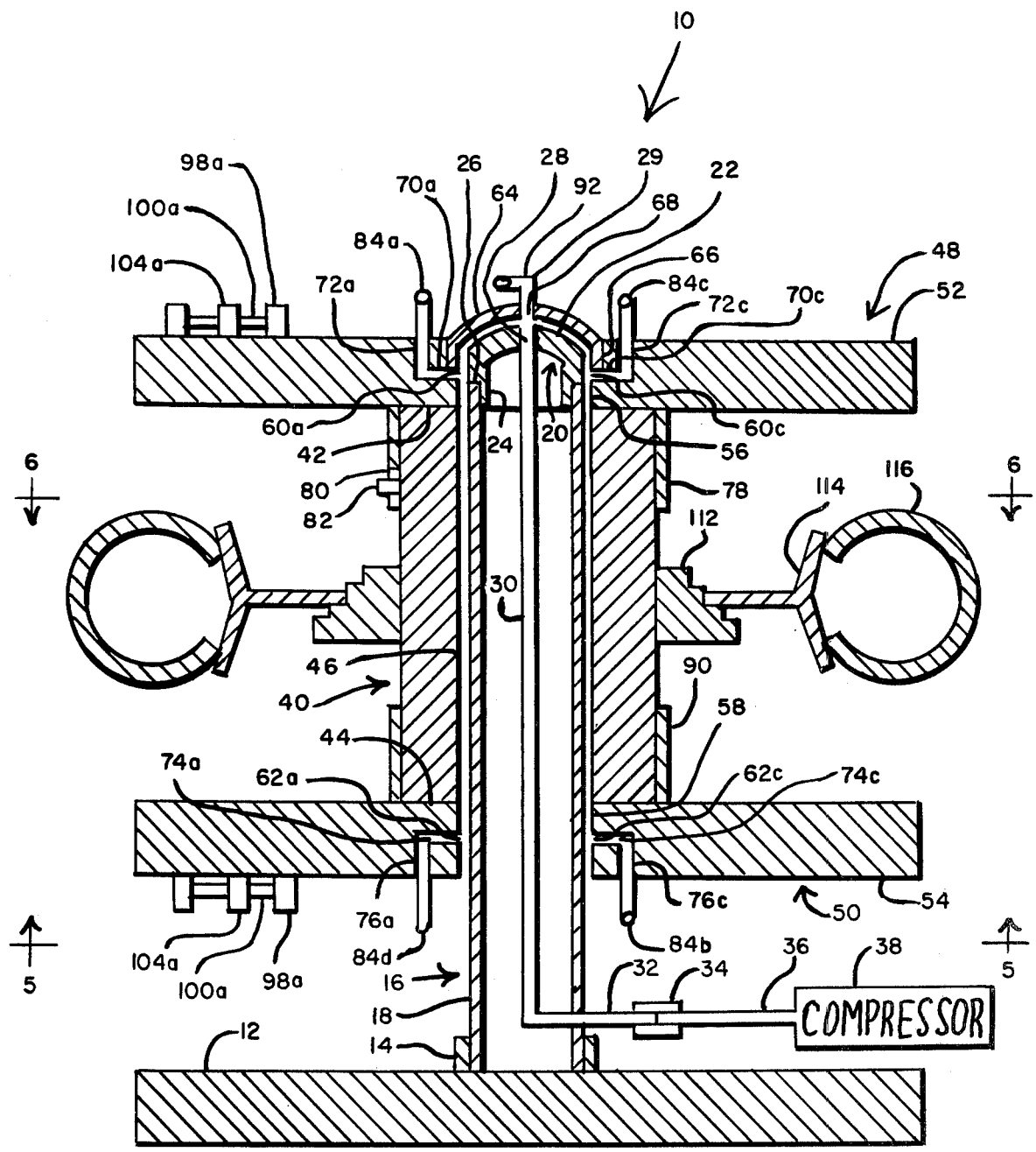
FIG. 2 is a vertical sectional view through certain sensing ports, the view being taken in the direction of line 2—2 of FIG. 1.

As can be seen from FIG. 2, an air supply tube 30 leads upwardly from a horizontal tube 32, and from a coupling 34 to which an air line 36 is attached, the upper end of the tube 30 connecting with the lower end of the passage 28. The air line 36 receives air under pressure from a compressor 38. Since my invention will find utility in repair garages and gasoline service stations, the compressor 38 will normally be the compressor supplying air to lifts, tire inflating equipment and the like. The only criteria imposed upon the air supply is that the air delivered to the apparatus 10 be clean and reasonably free of moisture; suitable filters and water removing traps can be readily installed in the air line 36 where it is part of a shop pneumatic system.

At this time, attention is directed to a cylindrical bearing body 40 having upper and lower faces 42, 44. Extending between the faces 42, 44 is a cylindrical bore 46 having a diameter only slightly greater than that of the post 16.

Resting on the upper face 42 of the bearing body 40 is an upper balancing mechanism denoted generally by the reference numeral 48. As will later become apparent, the mechanism 48 is removable from the bearing body 40. Confronting the lower face 44 of the bearing body 40 is a lower balancing mechanism denoted generally by the reference numeral 50. In this instance, the reason for which will hereinafter become evident, the mechanism 50 is anchored or secured to the bearing body 40. Other than the fact that the balancing mechanisms 48, 50 are spaced vertically by virtue of the intermediate bearing body 40, they are identical. Each includes a circular plate or platform and it will be helpful, it is believed, to assign separate reference numerals to these particular plates or platforms. Accordingly, the plate or platform included in the upper balancing mechanism 48 has been given the reference numeral 52, whereas the lower plate or platform has been identified by the reference numeral 54. Actually, the plates or platforms 52, 54 are annular, each having a central circular opening 56, 58 of the same diameter as the bore 46 of the bearing body 40. As will be perceived from FIGS. 2 and 4, the upper balancing mechanism 48, more specifically the opening 56 of the plate or platform 52, is provided with a plurality of quadrantly located upper sensing ports 60a, 60b, 60c and 60d. Similarly, the lower balancing mechanism 50, more specifically the opening 58 of the plate or platform 54, is provided with additional sensing ports 62a, 62b, 62c and 62d.

Inasmuch as the balancing mechanism 48 is at the top of the apparatus 10, in order to perform its particular role, there is a bearing cap 64 mounted thereon. Actually, the centrally disposed circular opening 56 is counterbored at 66 so as to provide an enlarged diameter portion for the fixed accommodation of the bearing cap 64 therein. From FIG. 2, it will be seen that the bearing cap 64 has a rounded configuration which provides a concave or dome-shaped inner surface which conforms to or complements the rounded surface imparted to the bearing member 20 attached to the upper end of the upstanding post 16. It will be perceived from FIG. 2 that the bearing cap 64 is provided with a central port 68 which is in substantial vertical alignment with the earlier-mentioned discharged port 28 in the rounded bearing member 20.

As will become clearer as the description progresses, some of the air flowing through the tube 30 passes upwardly through the discharge port 28 and exits via the port 68. However, only a portion of the air exits via the port 68, the remaining air being constrained to flow between the upper rounded surface 22 of the bearing member 20 and the domed bearing cap 64. Some of this latter-mentioned air flows to the previously mentioned sensing ports 60a, 60b, 60c and 60d located in the upper plate or platform 52 and some of the latter-mentioned air continues downwardly between the upstanding post 16 and the encircling bearing body 40 to the sensing ports 62a, 62b, 62c and 62d provided in the lower plate or platform 54. It has already been mentioned that the bore 46 of the cylindrical bearing body 40 is only slightly larger in diameter than that of the upstanding post 18. Because of the complementing curvature of the bearing member 20 and the bearing cap 64, the compressed air furnished via the tube 32, being of sufficient pressure for the area involved beneath the bearing cap 64 lifts the bearing cap, together with the upper plate or platform 52 to which the bearing cap 64 is secured. Because the plate or platform 52 is detachably secured (in a manner presently to be described) to the bearing body 40 and also since the lower plate or platform is fixedly secured (in a manner later to be described) to the bearing body 40, the entire assemblage is raised by reason of the resulting levitation.

Figure 4:
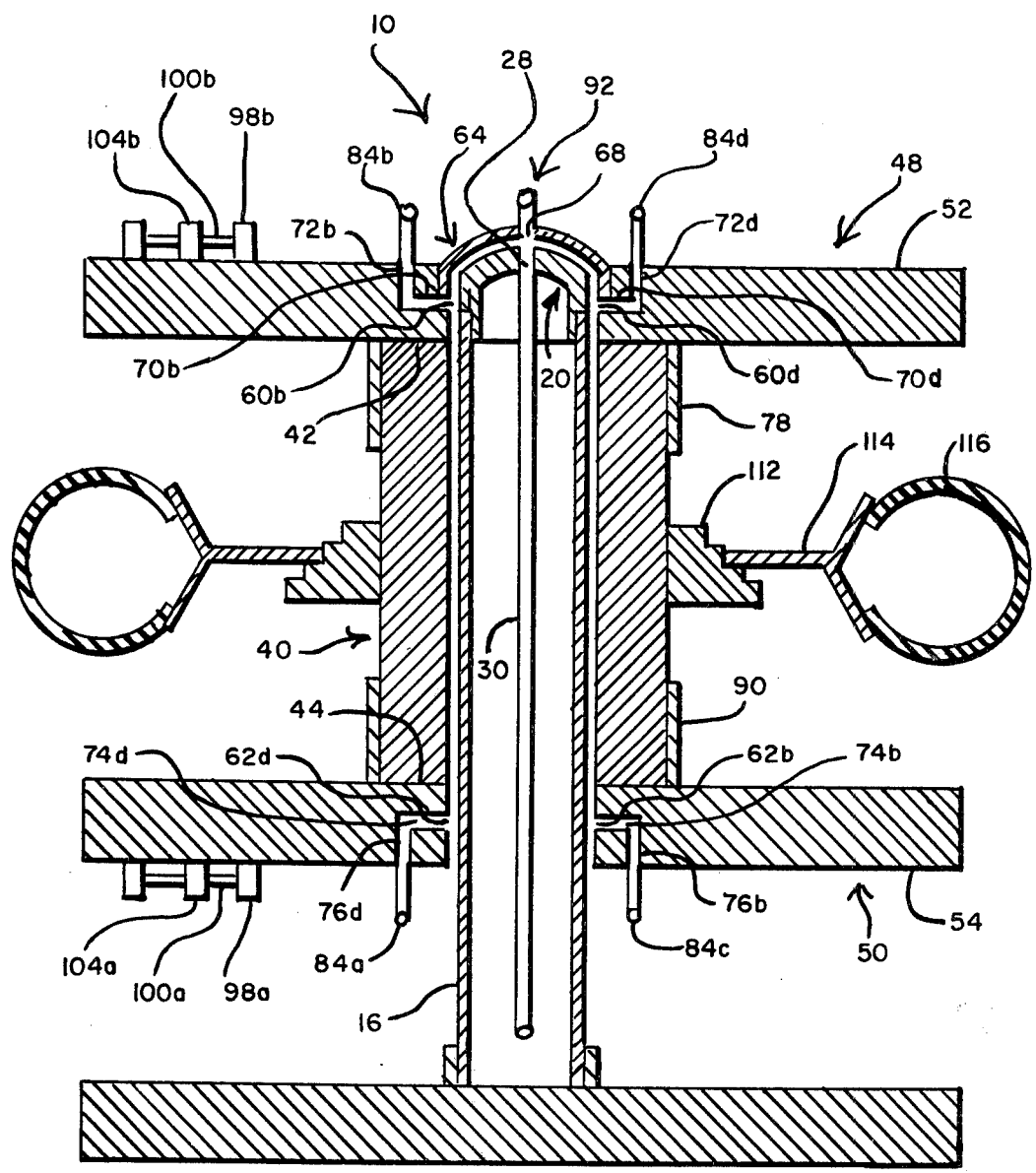
FIG. 4 is a vertical sectional view taken in the direction of line 4—4 which is perpendicular to that of FIG. 2 and exposing sensing ports not visible in FIG. 2.

From FIG. 2, it will be seen that the sensing ports 60a and 60c are connected, respectively, to horizontal passages 70a, 70c, whereas from FIG. 4 it will be observed that the sensing ports 60b and 60d are similarly connected to horizontal passages 70b and 70d. These horizontal passages 70a, 70b, 70c and 70d are connected to the lower ends of vertical passages 72a, 72b, 72c and 72d leading upwardly to the upper face of the plate or platform 52. In a similar fashion, there are lower horizontal passages 74a, 74b, 74c and 74d leading outwardly from the lower sensing ports 62a, 62b, 62c and 62d, respectively, the horizontal passages 74a, 74b, 74c and 74d communicating with the upper ends of vertical passages 76a, 76b, 76c and 76d that extend downwardly to the lower face of the lower plate or platform 54.

As previously mentioned, the upper balancing mechanism 48 is removable from the bearing body 40. Accordingly, the plate or platform 52 has a cylindrical sleeve 78 fixedly attached to its underside which extends downwardly therefrom. The sleeve 78 is formed with three inverted L-shaped slots 80, spaced unequally from each other, that receive therein three quadrantly located radial pins or bayonets 82 in order to determine the proper angular relationship of the top plate 52 when placed on the bearing body 40. The bearing body 40, being cylindrical, readily fits within the sleeve 78 as can be seen from FIGS. 2 and 3. More specifically, owing to the L-shaped configuration of the slots 80, the plate 52 is first lowered so that the pins or bayonets 82 enter the vertical leg portions of the slots 80 and when the underside of the plate 52 rests on the upper face 42 of the bearing body 40, then the plate 52 is twisted or rotated so that the pins or bayonets 82 move into the horizontal portions of the inverted L-shaped slots 80. Although detachable by reversing the above procedure, it will be understood that the plate 52 is held in place on the bearing body 40 when the pins 82 reside in the horizontal portions or legs of the inverted L-shaped slots 80.

The previously mentioned vertical passages 72a, 72b, 72c and 72d have ell fittings 84a, 84b, 84c and 84d, respectively, connected thereto. At this time, attention is directed to four pneumatic power amplifiers 86a, 86b, 86c and 86d that are responsive or sensitive to small pressures. Pneumatic amplifiers especially suited for the sensing and amplifying purpose herein required are currently being marketed by Norgren Fluidics, a division of the C. A. Norgren Co., 5400 South Delaware Street, Littleton, Colorado 80120. These amplifiers are sold under the trademark "BOOSTERMITE," being designated as Norgren/Fluidics type 5BV011. The mentioned type senses signal pressures on the order of from only 0.5 to 3.0 inches of water. The various ells 84a-84d are connected through the agency of tubes 88a, 88b, 88c, 88d to the inlet ports of the pneumatic amplifiers 86a, 86b, 86c and 86d. It may be well to explain at this particular point that the amplifiers 86a and 86c are responsive to whatever pressures exist at the sensing ports 60a and 60c. The amplifiers 86b and 86d are responsive to pressures at the sensing ports 60b and 60d. The power air to the amplifiers 86a-86d is supplied through the vertical port or passage 68 in the bearing cap 64. As already mentioned, air supplied through the tube 30 will support the bearing cap 64 and the bearing body 40 to which it is secured (plus of course the plate 52 of the upper balancing mechanism 48 and also the lower plate 54 of the mechanism 50). The lower plate 54 has a cylindrical sleeve 90 secured thereto and to the bearing body 40, as by welding, to thereby fixedly maintain the upper side of the plate 54 against the face 44. This is done in an air bearing manner, some of the air traversing the passage 68, but most passing first between the rounded upper surface 22 of the bearing 20 and the domed cap 64 and then downwardly between the upper plate 52 and the upper portion of the post 16 so as to affect the pressures at the various sensing ports 60a-60d, than downwardly through the bore 46 to affect the pressures at the sensing ports 62a-62d.

In order to conduct power air pressure to the various amplifiers 86a-86d on the top plate 52, a manifold 92 is connected to the upper end of the vertical passage or port 68. It is this air that is controlled by the amplifiers to provide pneumatic amplification for operating air motors not yet referred to, inasmuch as the air pressure differences at the sensing ports 60a-60d and 62a-62d are quite small, and it is these pressure differences that the pneumatic amplifiers respond to.

Two weight adjusting devices 94a and 94b are mounted on the top plate 52. Tubes 96a, 96b, 96c and 96d lead to reversible air motors 98a and 98b, the motor 98a being included in the device 94a and the motor 98b in the device 94b. The motor 98a has a threaded shaft 100a and the motor 98b a threaded shaft 100b. The shafts 100a and 100b, however, extend through weight members 104a and 104b which are axially positioned by the shafts 100a, 100b. Stated somewhat differently, the weight members 104a, 104b are adjustable in accordance with the degree of rotation of the respective shafts 100a and 100b. Each weight member 104a, 104b has a pointer 106 carried thereon, the pointer moving with the weight members along scales or graduated indicia labeled 108a and 108b, respectively. Thus, the weight members 104a and 104b will be shifted or positioned to whatever extent is needed to effect a balanced condition.

To offset the mass of the devices 94a and 94b, counterbalancing dummy weights 110a and 110b are placed diametrically opposite the devices 94a and 94b.

Inasmuch as the main purpose of the invention is to balance vehicle wheels, a stepped supporting ring 112 is secured in a circumscribing relation to the bearing body 40 intermediate or midway between its faces 42 and 44. The wheel to be balanced has been assigned to the reference numeral 114, having a tire 116 mounted thereon in a conventional manner. The supporting ring 112, wheel 114 and tire 116 are shown on a much smaller scale in relation to the apparatus 10 in order to permit use of a practical scale for the apparatus 10. In other words, the wheel 114 is not illustrated in proportion to the post 16, the bearing body 40 and the balancing mechanism 48, 50 comprising the apparatus 10.

Having mentioned the manifold 92, it will now be explained that there is a vertical passage 118 leading downward to a manifold 120 on the plate 54 of the lower balancing mechanism 50. The lower mechanism 50 performs the same function as the upper mechanism 48. However, it is not removable, being fastened to the bearing body 40 through the agency of the interconnecting sleeve 90 which is secured, as by welding, to both the body 40 and plate 54. However, the top plate 52, as previously pointed out, must be removed, this being in order to permit access to the supporting ring 112.

Figure 5:
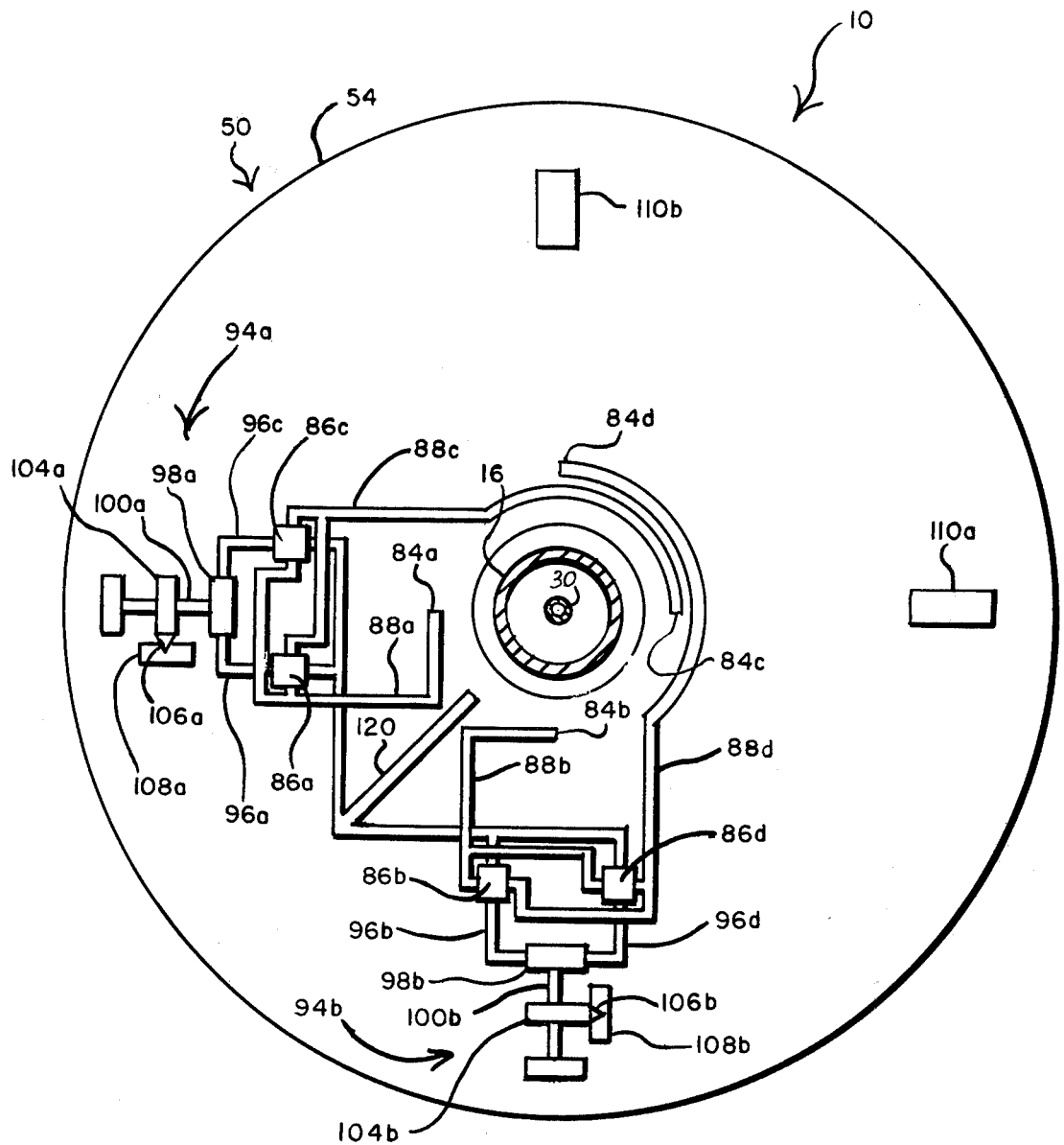
FIG. 5 is a bottom plan view, the view being taken in the direction of line 5—5 of FIG. 2.
Figure 6:
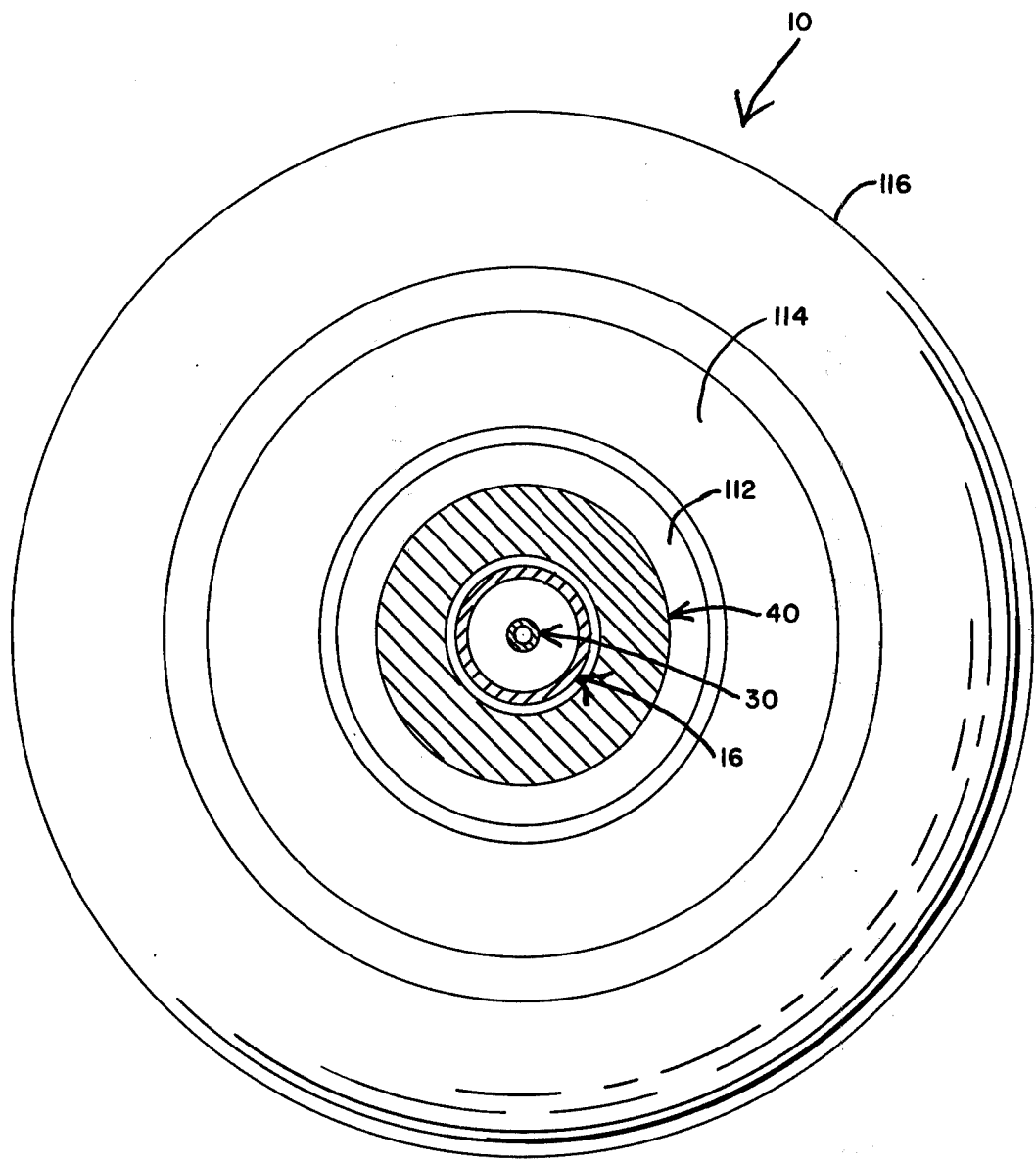
FIG. 6 is a horizontal sectional view taken in the direction of line 6—6 of FIG. 2, the view showing to better advantage the ring for supporting the wheel to be balanced.

The lower sensing ports 62a-62d have already been mentioned, together with the passages 74a-74d and 76a-76d extending therefrom. Inasmuch as the various components mounted on the upper side of the top plate 52, which comprise the upper balancing mechanism 48, are duplicated for the lower balancing mechanism 50, there is no need to refer specifically to each component mounted on the underside of the lower plate 54. Therefore, as can be seen in FIG. 5, the same reference numerals denote the duplicate components of the mechanism 50 mounted on the lower plate 54 that have already been referred to in conjunction with the mechanism 48 involving the upper plate 52. The numbering arrangement also applies to passages as well.

It will be recognized that when air is supplied through the tube 30, the bearing cap 64, the upper balancing mechanism 48 (because its plate 52 is secured to the cap 64), the bearing body 40 (because it is attached to the plate 52 by means of the pins or bayonets 82 and the sleeve 78) and the lower mechanism 50 (because it is permanently fastened to the bearing body 40) all "float" because of the air bearing action that occurs. While various ways can be employed for spinning or rotating the levitated parts mentioned above, a rather diagrammatically depicted means for doing this has been indicated generally by the reference numeral 122. The means 122 includes a lower bearing plate 124 secured to the post 16, and an upper bearing plate 126 secured to the underside of the plate or platform 54. The plates 124, 126 serve as a thrust bearing device and may be appropriately located, if desired, so as to maintain a very small clearance between the rounded bearing member 20 and the domed bearing cap 64, a clearance that is increased by the air bearing action resulting from the air exiting through the port 28 into the region between the members 20 and 64.

Figure 3:
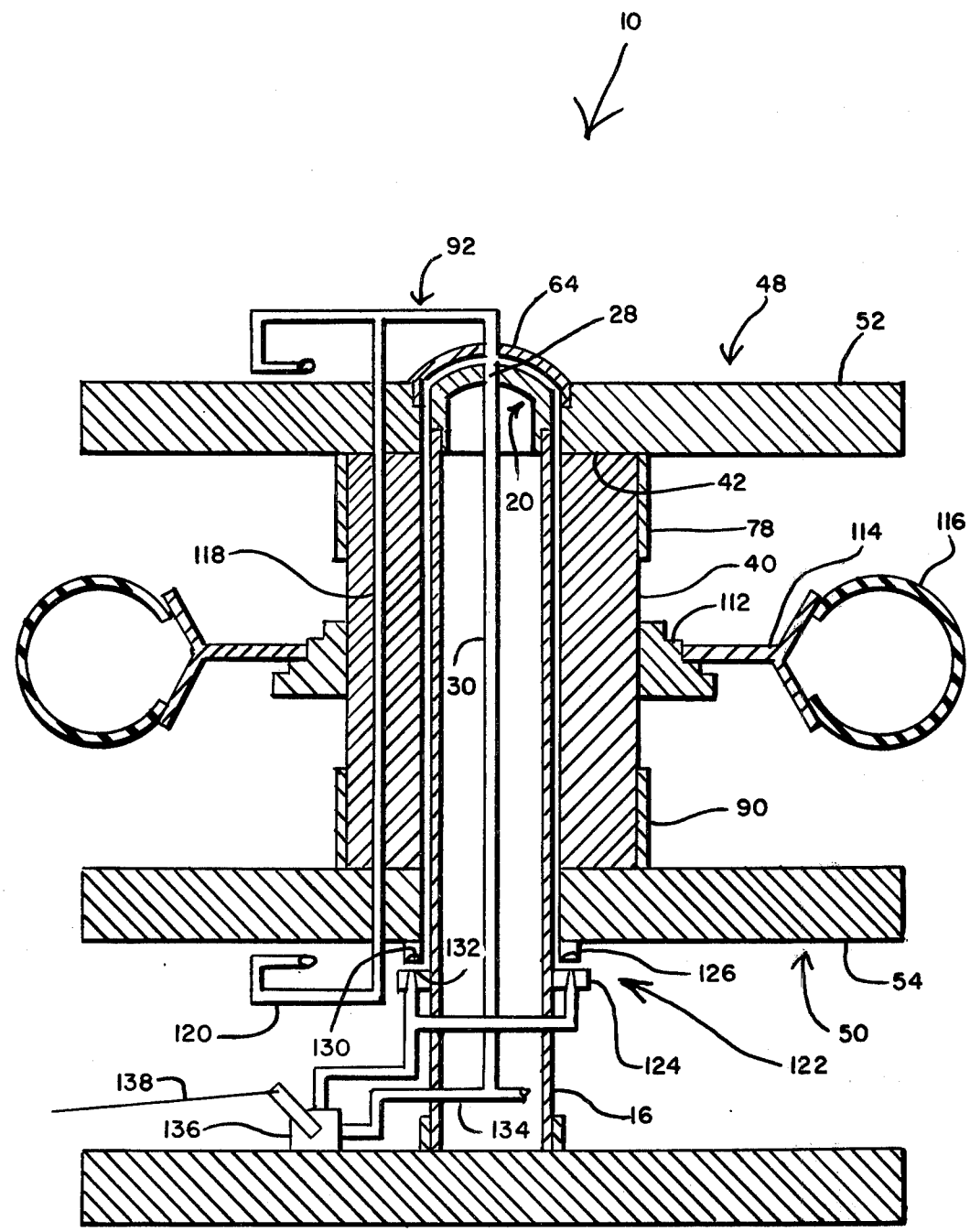
FIG. 3 is a sectional view taken in the direction of line 3—3 of FIG. 1 in order to show generally how air under pressure is used for rotating the balancing apparatus and also for operating the weight adjusting devices of the upper and lower balancing mechanisms.

From FIG. 3 it will be noted that a plurality of recesses or pockets 130 extend upwardly into the upper bearing plate 126. Although separate nozzles can be used, the lower bearing plate 124, which is stationary, is formed with a plurality of openings 132 via which air is discharged at an angle so as to impinge air against the pockets 130 to cause rotation of the bearing plate 126 and the plate 54 belonging to the lower balancing mechanism 50. Owing to the interconnection of the mechanism 50, more specifically its plate 54, with the bearing body 40 and the upper mechanism 48, these items also rotate in unison with the bearing plate 126.

Air is supplied to the nozzle openings 132 from the compressor 38 through a take-off line 134 connecting with the lower end of the tube 30, doing so through a valve 136 that can be opened and closed through the agency of a manually operable control rod 138 extending outwardly to a vantage point beyond the lower mechanism 50.

Having presented the foregoing information, the manner in which my pneumatic balancing apparatus 10 functions should be readily understood. First, with the upper balancing mechanism 48 removed, the wheel 114 is placed on the supporting ring 112. The upper mechanism 48, more specifically its plate 52, is then placed on the upper face 42 of the bearing body 40, care being exercised to make certain that in lowering the plate 52, the pins or bayonets 82 enter the slots 80 formed in the depending sleeve 78. This assures, after twisting the plate 52 to move the pins 82 into the horizontal legs of the inverted L-shaped slots 80, that the manifold 92 on the upper balancing mechanism 48 will be vertically aligned with the vertical passage 118 in the bearing body 40 to conduct power air pressure to the amplifiers on the lower balancing mechanism 50.

All that need be done at this stage is to start the compressor 38 (or turn on the valve from the shop air line) to cause air to flow upwardly through the tube 30. The air flow lifts the bearing body 40 and it continues to be levitated as long as air is directed against the domed bearing cap 64. Although some of the air continues upwardly through the vertical passage or port 68 formed in the cap 64, some of the air is deflected downwardly between the cylindrical post 16 and the encircling bearing body 40, more specifically through the clearance provided by the fact that its bore 46 is only slightly larger in diameter than the post diameter.

If the wheel 114 is truly in static balance, then the clearance between the bearing body 40 and the post 16 will be equal throughout the circumference of the post, and the resulting pressures at diametrically opposite pairs of sensing ports (60a, and 60c, 60b, and 60d, 62a and 62c, 64b and 64d) will be equal. That is, the difference in pressure between any two diametrically disposed sensing ports will be zero (or at least substantially zero). On the other hand, if the wheel 114 is unbalanced, then there will be a tilting of the bearing body 40, along with the upper and lower balancing mechanisms 48, 50, so that the clearance between the post 16 and the body 40 will be different from one side to the other, and consequently the pressures at oppositely located sensing ports will be different.

For example, if the tilting caused by unbalance is in a counterclockwise direction as viewed in FIG. 2, then the sensing port 60a will be farther from the post 16 than before and the sensing port 60c will be nearer the post 16 then before. Also, the sensing port 62a will be nearer post 16 then before and the sensing port 62c will be farther from the post 16 than before. The resulting pressure difference between the ports 60a, 60c will be sensed by the amplifiers 86a, 86c of the upper mechanism 48, and power air pressure then fed to the upper air motor 98a to shift the weight member 104a in the proper direction, in this case to the right, to correct for the sensed unbalance. In like manner, the resulting pressure difference between the ports 62a, 62c will be sensed and a similar corrective action made by the lower balancing mechanism 50. If there should be a tilting in a counterclockwise direction as viewed in FIG. 4, then the sensing ports 60b, 60d will be similarly affected with the consequence that the amplifiers 86b and 86d will provide control signals for the air motor 98b of the upper balancing mechanism 48 and the sensing ports 62b, 62d will do likewise for the motor 98b of the lower balancing mechanism 50.

The unbalance, and the resulting difference in air pressure, at the sensing ports 60a, 60c and 62a, 62c need not be the same, and when different, automatic correction is made for dynamic unbalance when the wheel 114 is rotating, such as after first having opened the valve 136 to activate the rotation means 122 and then closing the valve 136 to permit the wheel to "coast." The air motors 98a and 98b (both top and bottom) simply position the movable or shiftable weight members 104a, 104b so that a balanced condition is realized. After the weight members 104a, 104b (both top and bottom) stop moving, as when the amplifiers 86a–86d no longer sense a pressure differential, that is, a null condition is experienced, then the pointers 106a, 106b (both top and bottom) by reason of their positions relative the scales 108a, 108b inform the operator how much weight, and where, is to be added to the wheel 114.

When the called for weights have been added, the wheel 114 is truly balanced, statically (if the wheel 114 is not rotated) and dynamically (if the wheel 114 is rotated). This is all done in a very brief time interval.

I claim:

1. Wheel balancing apparatus comprising an upright post, a rounded bearing member at the upper end of said post providing a discharge port, means supplying air to said discharge port, a bearing body having a bore encircling a longitudinal portion of said post, the diameter of said bore being slightly larger than that of the portion of said post it encircles whereby tilting of said bearing body changes the clearance between said bearing body and post and said changing clearance causes a change in air pressure between said bearing body and post, means on said bearing body for supporting a vehicle wheel to be balanced, and a balancing mechanism including a domed bearing cap overlying said bearing member, said balancing mechanism being attached to said bearing body and said balancing mechanism further including means responsive to said air pressure change for sensing when said bearing body has been tilted by an unbalanced wheel placed on said supporting means.

2. Wheel balancing apparatus in accordance with claim 1 in which said balancing mechanism includes a weight adjusting device including a shiftable weight, said sensing means causing said weight adjusting device to position said shiftable weight in a direction to compensate for the unbalance of the vehicle wheel.

3. Wheel balancing apparatus comprising an upright post, a rounded bearing member at the upper end of said post providing a discharge port, a bearing body, upper and lower balancing mechanisms on said body, said body and mechanisms having vertically aligned cylindrical openings somewhat larger in diameter than that of said post, said upper balancing mechanism including a domed bearing cap overlying said bearing member so as to be levitated by air passing through said discharge port and then down through the aligned openings in the upper and lower balancing mechanisms, first means attaching said upper balancing mechanism to said bearing body, second means attaching said lower balancing mechanism to said bearing body, whereby said balancing mechanisms and said body are levitated together, said upper and lower balancing mechanisms each having two pairs of opposed angularly spaced sensing ports facing said post, and means on said bearing body for supporting a wheel to be balanced, whereby any difference in air pressure between oppositely located sensing ports is indicative of the degree of wheel unbalance.

4. Wheel balancing apparatus in accordance with claim 3 in which said four sensing ports of said upper balancing mechanism are 90° apart and in which said four sensing ports of said lower balancing mechanism are also 90° apart.

5. Wheel balancing apparatus in accordance with claim 4 in which the sensing ports of said lower and upper balancing mechanisms constitute first, second, third and fourth sensing ports, said first sensing port in each instance being located 180° from said third sensing port and said fourth sensing port in each instance being located 180° from said second sensing port, respective means connected to said first and third sensing ports for determining any difference in pressure between said first and third ports in each instance, and respective second means connected to said second and fourth sensing ports for determining any difference in pressure between said second and fourth ports in each instance.

6. Wheel balancing apparatus in accordance with claim 5 in which said lower and upper balancing mechanisms each include first adjustable weight means controlled by its said first pressure difference determining means and in which said lower and upper balancing mechanisms each include second adjustable weight means controlled by its said second pressure difference determining means.

7. Wheel balancing apparatus in accordance with claim 6 in which each first adjustable weight means includes a weight member movable in a direction parallel to said first and third sensing ports and in which each second adjustable weight means includes a weight member movable in a direction parallel to said second and fourth sensing ports.

8. Wheel balancing apparatus in accordance with claim 7 including fixedly disposed respective scale indicia relative to which each weight member moves, the position of the two weight members of each balancing mechanism with respect to their particular scale indices denoting both the amount and the position of weight to be used in balancing an unbalanced wheel.

9. Wheel balancing apparatus in accordance with claim 8 in which said bearing body is cylindrical and said upper and lower balancing mechanisms each include a circular plate, said plates being attached to the upper and lower ends, respectively, of said bearing body.

10. Wheel balancing apparatus in accordance with claim 9 in which the plate of said upper balancing mechanism is removably attached to said bearing body.

11. Wheel balancing apparatus in accordance with claim 10 including respective means on said plates for counterbalancing said various adjustable weight means.

12. Wheel balancing apparatus in accordance with claim 11 in which said plates each have an opening having a diameter corresponding to that of the bore of said bearing body, said plate opening and the bore of said bearing body constituting said previously-mentioned vertically aligned cylindrical openings, and the sensing ports of the upper balancing mechanism extending from the opening in the upper plate and the sensing ports of the lower balancing mechanism extending from the opening in the lower plate.

* * * * *